Feb. 11, 1969         J. L. LENAHAN ET AL         3,427,481
ULTRASONIC TRANSDUCER WITH A FLUOROCARBON DAMPER

Filed June 14, 1965

INVENTORS
JAMES L. LENAHAN
JOHN R. COLBERT

*Hill, Sherman, Meroni, Gross & Simpson*

ATTORNEYS

United States Patent Office 3,427,481
Patented Feb. 11, 1969

3,427,481
ULTRASONIC TRANSDUCER WITH A
FLUOROCARBON DAMPER
James L. Lenahan, Chicago, and John R. Colbert, Wood
Dale, Ill., assignors to Magnaflux Corporation, Chicago,
Ill., a corporation of Illinois
Filed June 14, 1965, Ser. No. 463,797
U.S. Cl. 310—8.2                                          14 Claims
Int. Cl. H04r 23/00, 31/00

ABSTRACT OF THE DISCLOSURE

A fluorocarbon resin layer bonded to a face of an ultrasonic transducer. The resin layer may be thick to utilize the high absorption properties of fluorocarbons in damping the sound emanated from the transducer face, or the layer may be thin to provide waterproofing for the transducer face. Particles of the resin are imbedded in a bonding agent and pressuredly bonded to the transducer face, thus overcoming the difficulty experienced in bonding fluorocarbons to other substances.

---

This invention relates to ultrasonic transducer units and methods of making such units to obtain improved performance characteristics and increased durability and reliability coupled with small size and weight.

The invention involves the use of polymerized fluorocarbon resin materials such as those marketed under the trademark "Teflon," which as is well known, have certain properties desirable in many applications such as high mechanical strength and resistance to corrosion and which have other properties not generally desirable including the fact that they cannot be readily bonded or adhered to. Such well known properties would appear to have no particular advantage in ultrasonic transducer applications and the fact that the material cannot be readily bonded or adhered to, would appear to prohibit use in such applications.

The invention resides in part on the finding that such fluorocarbon resin materials have other properties which make them far superior to other materials in performing certain functions desirable in ultrasonic transducer units and the invention also involves the use of such materials in a manner such as to utilize such properties while overcoming undesirable properties thereof.

According to this invention, a member is secured to one face of a piezoelectric transducer and includes a fluorocarbon resin and an adhesive material bonded to the fluorocarbon resin material and adhered to the face of the transducer in a manner to obtain strong acoustical coupling. In one application, the member is relatively thick and serves as an acoustical absorber. The fluorocarbon resin material is found to be highly advantageous in this application, because it has an extremely high acoustical absorption characteristic, higher than any other material known to be available. At the same time, the fluorocarbon resin material has a low acoustic impedance to permit effective use of its high absorption characteristic. The arrangement is particularly advantageous when the transducer is used in a pulse-echo system, in that the member can be used to substantially completely absorb ultrasonic waves emanated from the back face of a transducer and the transducer can be used for reception a very short time interval after transmission of a pulse of ultrasonic energy therefrom. At the same time, because of the high absorption characteristics of the fluorocarbon resin material the member can be relatively small as compared to backing members of prior systems. In a specific application of the invention, a so called "fingertip" transducer is provided which can be quite small and thin, utilizing the principles of this invention, so that it can be contacted with surface portions of a part which would otherwise be inaccessible.

In another preferred application of the invention, an immersion transducer is provided, wherein the member having the fluorocarbon resin material therein is disposed on the front surface of a transducer. In this application, the member is very thin so as not to substantially attenuate the ultrasonic waves, even with the high acoustical absorption characteristics of fluorocarbon resin material and at the same time, it prevents any substantial absorption of moisture, and transducers such as lithium sulphate crystals may be used which would otherwise not be possible because such crystals are water soluble. Due to the fact that the member can be quite thin, it has minimal damping effect on the operation of the transducer.

According to a specific feature of the invention, the fluorocarbon resin material is at least partly in the form of particles which are entrapped by interlocked films of the adhesive material. Thus an effective bonding to the back face of the crystal can be obtained and yet the high acoustical absorption characteristics of the fluorocarbon resin material can be realized.

According to another specific feature of the invention, particles of plastic material are mixed with particles of fluorocarbon resin material and pressure is applied to fuse the fluorocarbon resin material particles and to entrap the particles of plastic material, while an adhesive is used to secure the member so formed to the back face of a transducer, a bond being obtained through the adherence of the adhesive to the particles of plastic material.

According to a further feature of the invention, fluorocarbon resin particles are mixed with a cyanoacrylate monomer modified with a thickening agent and a plasticizer and is applied to the face of a transducer the modified cyanoacrylate monomer being effective when cured under pressure to adhere the fluorocarbon resin to the face of the transducer. Preferably, the mixture of the fluorocarbon resin and the modified cyanoacrylate monomer is applied as a paste in a thin layer on the face of the transducer, after which fluorocarbon resin particles are applied in quantity and pressure is applied to fuse the fluorocarbon resin particles into a solid mass with the cyanoacrylate monomer being effective to bond the mass to the transducer.

In accordance with a further specific feature of the invention, the face of a transducer is adhesively secured to the planar end face of an annular ring and the fluorocarbon resin material and adhesive materials are applied within the ring and against the face of the transducer, to form a backing member therefor.

This invention contemplates other and more specific objects, features and advantages which will become more fully apparent from the following detailed description taken in conjunction with the accompanying drawings which illustrate preferred embodiments and in which.

Figure 1:
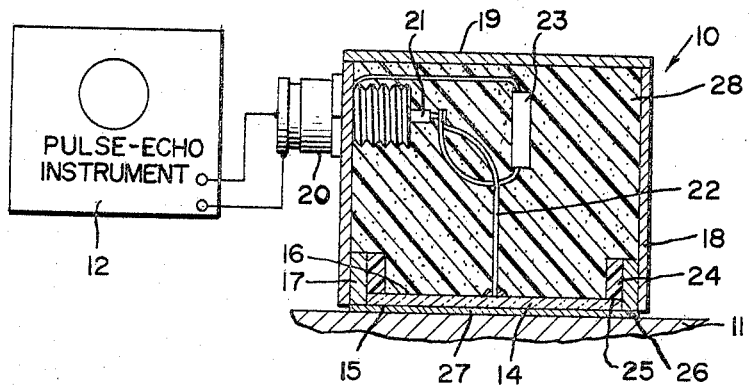
FIGURE 1 is a cross-sectional view of a transducer unit constructed according to the principles of this invention and diagrammatically illustrates the connection thereof to a pulse-echo instrument.

Reference 10 generally designates an ultrasonic transducer unit constructed according to the principles of this invention which may be pressed into engagement with a part 11 for detection of defects therein. As diagrammatically illustrated, the transducer unit 10 may be connected to a pulse-echo instrument 12 to be energized by an electrical pulse and to transmit a pulse of ultrasonic energy into the part 11 and to thereafter convert ultrasonic echoes to electrical pulses transmitted to the instrument 12 for indication thereby. The transducer unit 10 may be of any desired size, but preferably may be a very small "fingertip transducer" type. By way of example, the transducer unit 10 may be about ⅜ inch square and ½ inch in thickness.

The transducer unit 10 comprises piezoelectric transducer 14 which may be a quartz crystal, for example, having electrodes 15 and 16 on the back and front faces thereof. The electrode 15 on the front face is connected electrically to an annular member or ring 17 of brass or other conductive material which is fitted into one end of a bore in a metal case 18 having a cover 19. A connector 20 is threaded into an opening in the wall of the case 18 and has an inner conductor 21 to which is soldered one end of a lead 22 soldered at its other end to a central point on the electrode 16 on the back face of the crystal 14. If desired, a coil 23 may be provided within the case 18 having leads soldered to the case 18 and conductor 21.

A ring 24 of insulating material is disposed within the ring 17 and serves to support the crystal and to insure insulation of the electrode 16 from the case 18, and also facilitates assembly as hereinafter described. It is noted that the rear face of the crystal 14 is disposed against a planar face 25 of the ring 24 while the front face of the crystal 14 is co-planar with an end face 26 of the ring 17.

To protect the crystal 14 and the electrode 15, a wear plate 27 is secured on the electrode 15 and also on the face 26 of the ring 17.

In accordance with this invention, the case 18 is substantially filled with a material forming a backing member 28 for the crystal 14 and operating as a damping medium to substantially completely absorb ultrasonic waves emanated from the back face. The complete absorption of waves is particularly important in testing applications. For example, in a pulse-echo system, it is important that the crystal be ready to receive echoes as soon as possible after transmission of a pulse and that there be no echoes back from within the member 28 which might obscure echoes from within the part 11 or be misinterpreted as being from flaws within the part 11.

The member comprises a polymerized fluorocarbon resin material and an adhesive material bonded to the fluorocarbon resin material and adhered to the electrode 16 on the back face of the crystal 14. By way of example, the fluorocarbon resin material may be a fluoroethylenepropylene, i.e. a fluorinated copolymer of ethylene and propylene, or it may be in the form of polytetrafluoroethylene, in either particulate or solid form, or a combination of both, as hereinafter described. Polytetrafluoroethylene particles may be obtained using the methods disclosed in the Plunkett Patent No. 2,230,654, the Brubaker Patent No. 2,393,967 and Joyce Patent No. 2,394,243. The term "fluorocarbon resin" as used herein is intended to cover such materials and materials having substantially the same acoustical and other properties. As previously indicated, such fluorocarbon resin materials have extremely high acoustical absorption characteristics, higher than any other materials known to be available.

Figure 2:
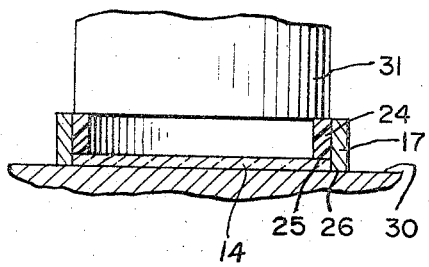
FIGURE 2 is a cross-sectional view illustrating one step in the formation of the transducer unit of FIGURE 1.

As an example of one preferred method of construction of the transducer unit 10, the crystal 14 is disposed against a fixed planar surface 30 with the ring 17 surrounding the crystal 14 having its surface 26 engaged with the surface 30 and with the insulating ring 24 inside the ring 17, as shown in FIG. 2. In so assembling the parts, glue is applied between the surface 25 of the insulating ring 24 and the crystal 14 and between the outer surface of the ring 24 and the inner surface of the ring 17. By means of a clamping member 31, pressure is applied to the ring 24 so that the load on the crystal 14 is distributed. After the glue is dried, the assembly is lapped to remove glue and to make certain that the front surface of the crystal 14 and the surface 26 of the ring 17 are flush and flat.

The assembly is then vacuum plated across the front surface of the crystal 14 and the surface 26, and thereafter an aluminum foil is cemented across the plated faces, preferably using an epoxy glue. The wear plate 27 is then glued to the assembly, preferably using an epoxy glue.

The lead wire 22 is then soldered to plating on the back side of the crystal 14, formed thereon before assembly. In the event that a crystal is used not having a plating on its back side, an expansion or bore type snap ring may be disposed within the insulating ring 24 after inserting the lead wire 22 therein and the crystal may then be silver painted with a small brush.

Next, the outer surface of the ring 17 is cleaned and silver epoxy is applied to the outer surface of the ring 17 all the way around and also to the inner surface of the case 18. With the assembly resting on a flat surface, the case 18 is then pushed down over the assembly, while working the case 18 back and forth on the axis of its bore to squeeze out any silver epoxy that may lump up at the crystal end of the case. Some silver epoxy may pile up along the bore wall of the case 18, but no attempt should be made to touch or remove the same.

Next, the connector 20 is installed, preferably with the connector being soldered to the case and preferably with glue being applied to the threads of the connector to obtain a seal. The lead wire 22 may then be soldered to the inner conductor 21, and the coil 23 may be installed, if desired.

Next, the backing 28 is prepared. As one preferred example, 70% by weight of Du Pont No. 5 tetrafluoroethylene "Teflon" molding composition and 30% of a Bakelite epoxy glue are mixed and applied within the case 18. The mixture is packed down as much as possible and is preferably then centrifuged, by rotating a speed of 2000 r.p.m. for about 10 minutes.

With this method, the glue or adhesive forms a casting or bonding medium which hardens to adhere to the back of the transducer and to form what may be considered as a sponge with the voids thereof occupied by the fluorocarbon resin particles and with each fluorocarbon resin particle entrapped by interlinked films of the bonding medium. Thus the bonding medium acts only to perform an entrapment function. It may more properly be though of as a solidified emulsion. Accordingly, even though there is no adhesive bond between the fluorocarbon resin particles and the adhesive, there is nevertheless a physical or mechanical bond in which the particles are held in place and in which the adhesive forms an ultrasonic wave couplant to transmit the waves efficiently into the fluorocarbon resin particles for absorption thereby.

Although an epoxy resin is preferred as the adhesive material, it is also possible to use other adhesives such as silicone rubber, glue, cements, ceramics, and the like.

In another preferred method according to the invention, fluorocarbon resin particles are utilized having the ability to fuse into a solid block at relatively low temperatures. After performing the preparatory steps as described above, such particles are poured into the case 18 and pressure is applied either manually or with the use of a centrifuge, to cause the particles to bond and form a solid block conforming to the contour of the interior of the unit and firmly engaged with the back of the transducer, so that ultrasonic waves are coupled directly into the solidified fluorocarbon resin material. Preferably an amount of the fluorocarbon resin particles are mixed with a pressure bonding adhesive, most preferably a cyanoacrylate monomer modified with a thickening agent and plasticizer. The mixture thus formed is spread over the back face of the crystal after which the remainder of the case is filled with the fluorocarbon resin particles, and pressure is applied to cause the fluorocarbon resin particles to fuse while the adhesive cures to form a bond to the back face of the crystal and also to entrap a quantity of the fluorocarbon resin particles in a sponge-like structure. The remaining fluorocarbon resin particles are pressure fused into a solid mass thus giving a pressure formed, solid, integral absorber which is thoroughly bonded to the back face of the crystal. As a specific example, Du Pont No. 7 tetrafluoroethylene particles are mixed with an Eastman 910 cyanoacrylate monomer pressure bonding adhesive.

As another example, fluorocarbon resin particles are mixed with particles of a plastic material which can be readily adhered to, such as an epoxy resin, and the mixture of such particles is subjected to pressure while within a suitable mold to form a fused block having the particles of plastic material embedded therein. The fused block so formed can then be secured by a suitable adhesive to the back face of a transducer or to an acoustic transmission line or the like, to absorb acoustical waves therefrom. Preferably, a small charge of the plastic and fluorocarbon resin particles can be used only along a certain surface of the block while the rest can be a pure fluorocarbon resin material. Du Pont No. 7 tetrafluoroethylene or "Teflon" particles are suitable.

It is noteworthy that in the last-described method as well as in the preceding methods, it is not necessary or desirable to subject the fused fluorocarbon resin to high temperatures for sintering. The fusion obtained at low temperatures is sufficient to obtain high acoustical absorption characteristics, and the application of high temperatures could damage the crystal and the adhesives used in the transducer unit.

It is also noted that in each of the foregoing methods, it is possible to mix in other substances such as for example tungsten powder, to modify the acoustical characteristics as desired.

Figure 3:
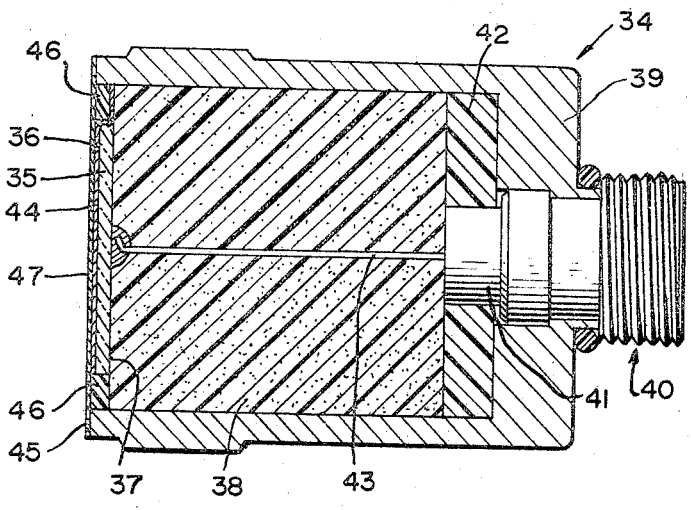
FIGURE 3 is a cross-sectional view illustrating a modified transducer construction.

Referring to FIGURE 3, reference 34 generally designates a modified form of transducer unit constructed according to the invention, designed for immersion testing wherein the transducer unit 34 and a part to be tested are immersed in a tank of water with the water serving as a couplant between the transducer unit and the part. The transducer unit 34 comprises a piezoelectric transducer 35, which may be a lithium sulphate crystal, subject to damage from moisture absorption.

The crystal 35 is a front face 36 for emanating ultrasonic waves an a back face 37 which is adhesively secured to a backing member 38 of acoustically absorbent material. The backing member 38 may be a fused block of a fluorocarbon resin material made according to one of the previously described methods, although another material may be used if desired.

As illustrated, the backing member 38 is disposed within a cylindrical metallic housing 39 which carries a coaxial connector 40, for connection to suitable energizing apparatus. A cylindrical conductor of the coaxial connector 40 is connected to a cylindrical conductor 41 which is disposed within an insulating disk 42 in the housing 39. The conductor 41 is connected to one end of a lead 43 extending through the backing member 38, the other end of the lead 43 being soldered or otherwise connected to a conductive coating plated on or otherwise secured to the back face 37 of the crystal 35 and forming an electrode thereon. A conductive paint 44, such as a silver epoxy paint, is applied to form an electrode on the front face of the crystal 11 and is extended over to the inner surface of the cylindrical housing 39 to provide an electrical connection through the housing to the outer conductor of the coaxial connector 16.

By way of example, the transducer 34 may be connected to pulse-echo apparatus, operative to periodically apply an electrical impulse to the electrodes on the opposite faces of the crystal 35, to develop a burst of ultrasonic waves, which are emanated from the front face 36 of the crystal 35. Between application of such periodic impulses to the crystal 35, the pulse-echo apparatus may "listen" for returning echoes. In the alternative, the transducer may be continuously energized and the ultrasonic waves may be used for through-transmission testing.

The housing 39 has an end face 45 which is coplanar with the surface of the paint 44 applied to the front face 36 of the crystal 35. The space around the crystal and within the housing 39 may be filled in with a suitable plastic insulating material 46, such as an epoxy resin.

In accordance with this invention, a thin film or layer 47 of a fluorocarbon resin material is secured or formed over the front face of the unit, to serve as a moisture-proof barrier, while being sufficiently thin so as not to interfere with the transmission of ultrasonic waves from the front face 36 of the crystal 35 and so as not to substantially damp the crystal. Preferably, the layer 47 may have a thickness on the order of from 0.005 to 0.010 inch. The layer 47 may preferably be a film of fluoroethylenepropylene. To secure the fluorocarbon resin film 47 to the surface of the electrode 44 and the face 45, it may be treated with an etchant which operates to eat away the fluorinated plastic structure and to leave behind a chlorinated or hydrocarbon structure. An adhesive such as an epoxy glue is then used to bond the remaining chlorinated or hydrocarbon structure to the surfaces. A Du Pont "Teflon" FEP film-type C, is available commercially for this purpose.

It will be understood that modifications and variations may be effected without departing from the spirit and scope of the novel concepts of this invention.

We claim as our invention:

1. In an ultrasonic transducer unit, a piezoelectric transducer having opposed faces, and a member secured to one of said faces comprising fluorocarbon resin material and adhesive material bonded to said fluorocarbon resin material and adhered to said one face of said transducer.

2. In an ultrasonic transducer unit as defined in claim 1, said member being relatively thick with said fluorocarbon resin material being effective to substantially absorb ultrasonic waves emanated from said one face of said transducer.

3. In an ultrasonic transducer unit as defined in claim 1, said member being relatively thin to form a moisture-proof coating on said one face of said transducer without substantially attenuating ultrasonic waves emanated therefrom.

4. In an ultrasonic transducer unit, a piezoelectric transducer having opposed faces, and a member secured to one of said faces comprising fluorocarbon resin material and adhesive material bonded to said fluorocarbon resin material and adhered to said one face of said transducer, said fluorocarbon resin material being at least partly in the form of particles entrapped by interlinked films of said adhesive material.

5. In an ultrasonic transducer unit, a piezoelectric transducer having opposed faces, a member secured to one of said faces comprising fluorocarbon resin material and adhesive material bonded to said fluorocarbon resin material and adhered to said one face of said transducer, said fluorocarbon resin material being in part pressure molded into a solid mass.

6. In an ultrasonic transducer unit, a piezoelectric transducer having parallel opposed faces, and a member secured to one of said faces and comprising particles of plastic material, fluorocarbon resin material pressure molded to entrap said particles of plastic material and an adhesive adhered to one said face of one transducer and to particles of said plastic material to form a bond to said fluorocarbon resin material.

7. In an ultrasonic transducer unit, a piezoelectric transducer having opposed faces, and a member secured to one of said faces comprising fluorocarbon resin material and adhesive material bonded to said fluorocarbon resin material and adhered to said one face of said transducer, said member in the region thereof adjacent to said one face of said transducer comprising fluorocarbon resin material and a cyanoacrylate monomer modified with a thickening agent and plasticized and cured under pressure to adhere to said face with the remainder of said member comprising substantially pure fluorocarbon resin material pressure fused into a solid.

8. In an ultrasonic transducer unit as defined in claim 7, said member being relatively thin to form a moisture proof coating on said face without substantially attenuating ultrasonic waves.

9. In an ultrasonic transducer unit as defined in claim 7, said member being relatively thick with said fluorocarbon resin material being effective to substantially absorb ultrasonic waves emanated from said one face of said transducer.

10. In an ultrasonic transducer unit, an annular member having a planar end face, a piezoelectric transducer having opposed faces with one of said faces disposed against said planar end face of said annular member, and an absorber disposed within said annular member and including fluorocarbon resin material and an adhesive material bonded to said fluorocarbon resin material and adhered to said one face of said transducer.

11. In an ultrasonic transducer unit as defined in claim 10 said fluorocarbon resin material being in part pressure fused within said annular member into a solid mass.

12. In an ultrasonic transducer unit, an outer annular member of rigid conductive material having a planar end face, an inner annular member of insulating material having an outer surface adhesively secured to the inner surface of said outer annular member and having a planar end face spaced inwardly from said inner end face of said outer annular member, a piezoelectric transducer having parallel opposed faces disposed with one of said faces against said planar end face of said inner annular member and with the other of said faces generally coplanar with said planar end face of said outer member, thin electrodes on said parallel opposed faces of said transducer, a lead connected to a central portion of said electrode on said one of said faces, means connecting the electrode on the other of said face to said outer annular member, and an absorber disposed within said annular member about said lead and including fluorocarbon resin material and an adhesive bonded to said fluorocarbon resin material and adhered to said one face of said transducer.

13. In an ultrasonic wave absorber, a member including fluorocarbon resin material an adhesive material, said fluorocarbon resin material being at least partly in form of particles entrapped by interlinked films of said adhesive material.

14. In an ultrasonic wave absorber, a member including particles of plastic material and fluorocarbon resin material said fluorocarbon resin material being pressure molded to entrap said particles of plastic material.

References Cited

UNITED STATES PATENTS

| | | | |
|---|---|---|---|
| 3,321,648 | 5/1967 | Kolm | 310—8.2 |
| 2,748,369 | 12/1951 | Smyth | 340—10 |
| 3,270,330 | 8/1966 | Weinberg | 310—8.2 |
| 3,200,369 | 8/1965 | Neubauer | 310—9.1 |
| 2,972,068 | 2/1961 | Howry | 310—9.1 |
| 2,946,904 | 7/1960 | Renaux | 310—8.2 |
| 2,875,354 | 2/1959 | Harris | 310—8.2 |
| 2,872,600 | 2/1959 | Peck | 310—8.7 |
| 2,830,202 | 4/1958 | Feinstein | 310—8.7 |
| 2,753,543 | 7/1956 | Rymes | 340—10 |
| 3,277,435 | 10/1966 | Thompson | 340—10 |

J D MILLER, *Primary Examiner.*

U.S. Cl. X.R.

310—9.1; 340—10